(No Model.)

D. A. JONES.
LOCK SNAP.

No. 495,416. Patented Apr. 11, 1893.

Witnesses:
Severance
O. C. Hines

Inventor:
Daniel A. Jones
by his Attys
Mason, Fenwick & Lawrence

UNITED STATES PATENT OFFICE.

DANIEL A. JONES, OF OSHKOSH, WISCONSIN.

LOCK-SNAP.

SPECIFICATION forming part of Letters Patent No. 495,416, dated April 11, 1893.

Application filed December 24, 1892. Serial No. 456,244. (No model.)

*To all whom it may concern:*

Be it known that I, DANIEL A. JONES, a citizen of the United States, residing at the city of Oshkosh, in the county of Winnebago and State of Wisconsin, have invented certain new and useful Improvements in Lock-Snaps; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
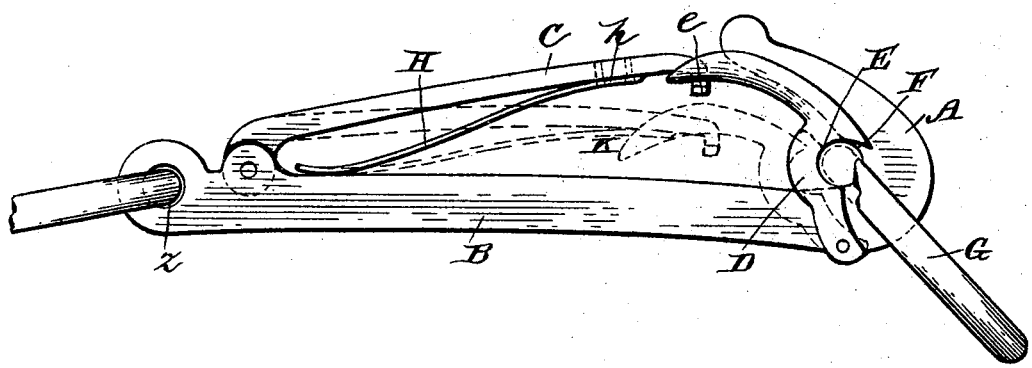
Figure 2:
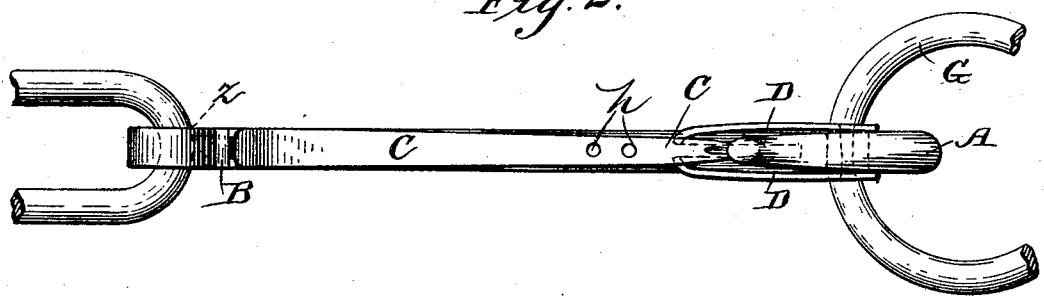
Figure 3:
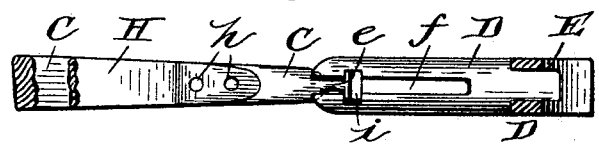

My invention relates to improvements in lock-snaps for harness and the like and the objects of my invention are, first, to effectually lock the ring in the snap; second, to facilitate easy opening when required, and third, to insure durability. I attain these objects by the construction and mechanism shown in the accompanying drawings in which, Figure 1 is a side view and Fig. 2 a front view of the snap, and Fig. 3 is a rear view of the dog.

Similar letters refer to similar parts throughout the several views.

A is the loop, B the shank and C the tongue of the snap.

D is a dog hung at or near the loop of the snap and working back upon the tongue C. Integral with the tongue C is a headed pin $e$ which extends through and travels in the slot $f$ in the dog, the head of the pin $i$ serving to retain it in the slot.

H is a lifting spring attached to the tongue at $h$ and extending backward between the tongue and shank of the snap.

The dog D is constructed with a semicircular depression at E and there is also a corresponding depression in the loop of the hook at F, both being intended to constitute a circular opening into which the ring G passes and is held securely until released by the dog when the snap is unlocked. This circular depression may be in the dog only or partly in the dog and partly in the hook as shown. The lower portion of the dog is bifurcated to fit the shank or body portion of the snap hook in the manner shown and is pivoted on the outside of the shank by a pin passed through the shank and the lower ends of the bifurcated portions. By this construction the shank or body portion of the hook can be made solid and renders it much stronger than if the shank was slotted and the dog pivoted in the slot.

By pressing down upon the tongue the spring H is compressed and the dog D is carried downward the pin $e$ sliding upward in the slot $f$. When down the tongue and dog are at the dotted position K and the ring G may then be passed out of the snap. When the tongue is released the spring H forces it back to its original position. I regard as an important feature of my invention the situation and manner of attaching the spring H, it being attached at the upper end of the tongue to work backward. In the operation of the spring the opposite end only travels a short distance along the shank of the snap. It is only compressed slightly, the action is rendered easy and the wear upon the spring reduced to a minimum, and by having the spring arranged between the shank and the tongue of the hook instead of on the under side of the shank, a further advantage is secured in addition to those named, to wit, it is not liable to catch into anything and be broken off.

The drawings illustrate a form of the snap-lock used in fire harnesses where it is attached by a link passing through the opening $z$. The shape of the lower end and the opening may be varied to suit other methods of attachment and to adapt the invention to all parts of a harness where snaps are used.

My invention is also adapted to a check-rein hook, the ring G connecting with the check rein and the opposite end of the snap being attached to the back-pad of the harness.

What I claim as my invention is—

1. A lock snap comprising a solid shank attaching portion provided with an open loop, a tongue pivoted to the shank and extended forward to a point near the loop, a dog pivoted near the loop and connected with the tongue and a spring interposed between the upper surface of the shank and the under surface of the tongue, substantially as described.

2. A lock snap comprising a shank attaching portion provided with an open loop, a headed tongue pivoted near the attaching end of the shank and extended forward in close proximity of the loop, a dog pivoted near the loop and provided with a slot which receives the head of the tongue and a spring interposed between the head and shank, substantially as described.

3. A lock snap comprising a solid shank attaching portion provided with an open loop, a tongue pivoted to the shank near the attaching end of the shank and extended forward to a point in close proximity to the loop, a dog having a bifurcated attaching end which is pivoted on the outside of the shank, and a flat spring attached to the under side of the upper end of the tongue and bearing with its lower free end upon the upper surface of the shank, substantially as described.

In testimony whereof I affix my signature in presence of two witnesses.

DANIEL A. JONES.

Witnesses:
CLARENCE TURCK,
CHARLES J. SCHMITT.